Jan. 24, 1956  G. M. TARZIAN  2,731,749
MEANS OF DISPLAYING PICTURES
Filed April 29, 1953  2 Sheets-Sheet 1
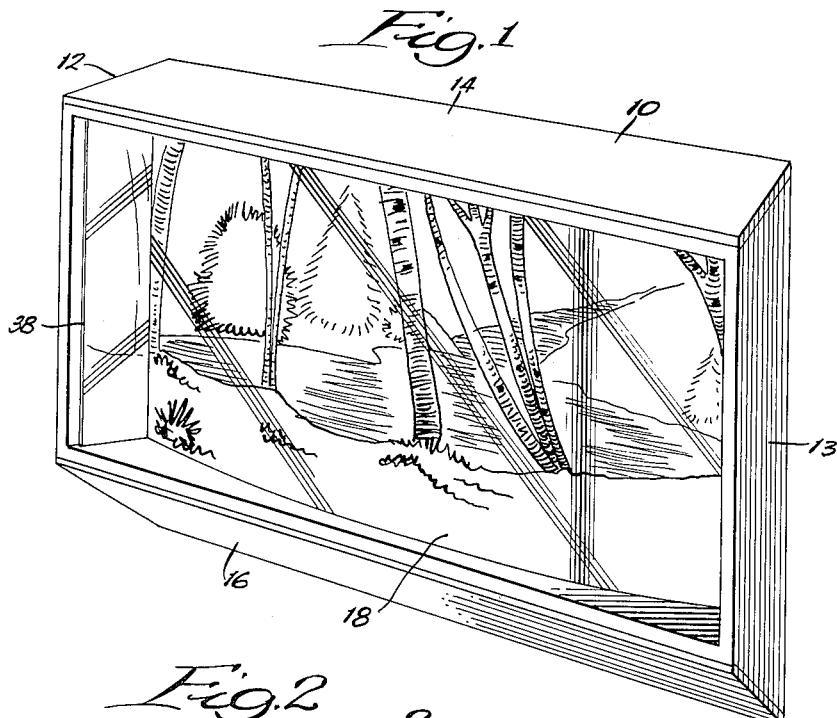
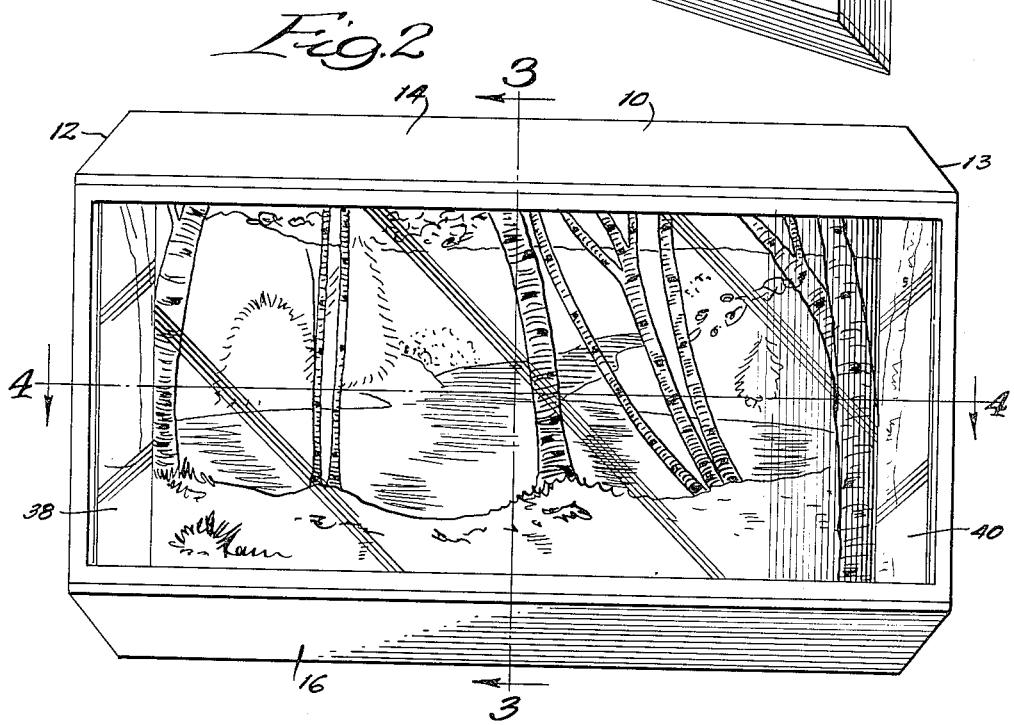
INVENTOR:
George M. Tarzian,
BY
Orms, McDougall, Williams & Hersh,
ATTORNEYS.

Jan. 24, 1956 G. M. TARZIAN 2,731,749
MEANS OF DISPLAYING PICTURES
Filed April 29, 1953 2 Sheets-Sheet 2
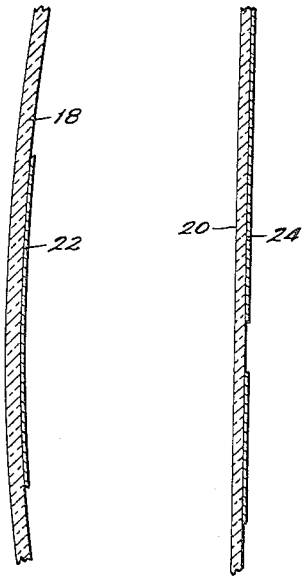
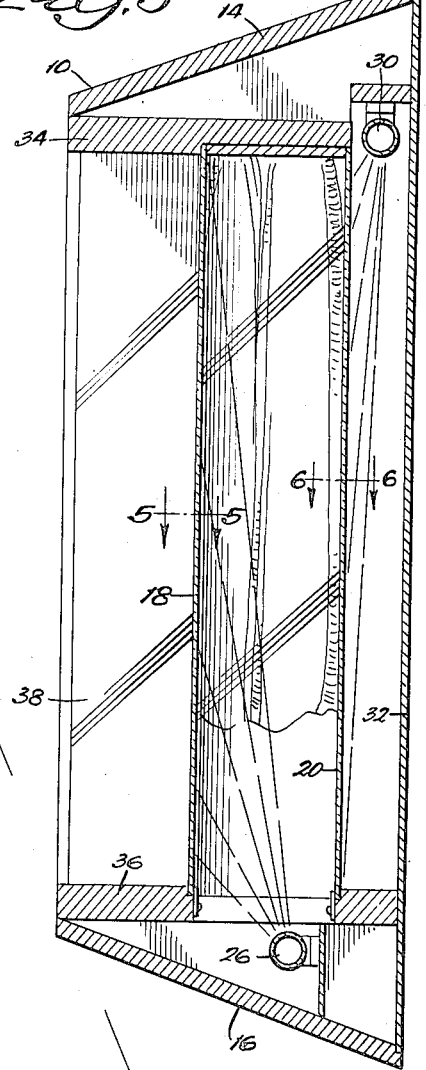
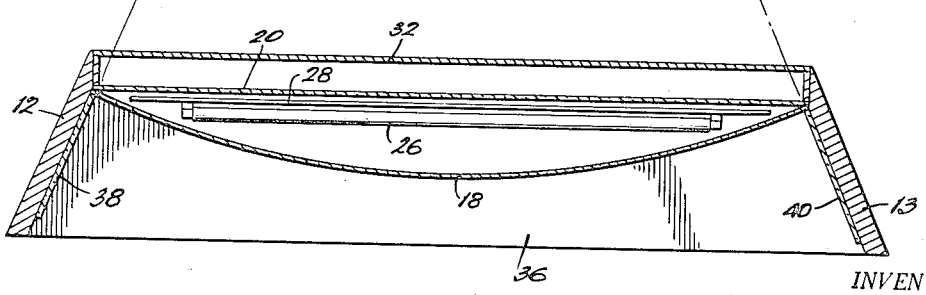
INVENTOR:
George M. Tarzian,
BY
Osmun, McDougall, Williams & Hersh,
ATTORNEYS.

United States Patent Office 2,731,749
Patented Jan. 24, 1956

2,731,749

MEANS OF DISPLAYING PICTURES

George M. Tarzian, Chicago, Ill.

Application April 29, 1953, Serial No. 351,835

2 Claims. (Cl. 40—160)

This invention relates to a new and improved means for displaying pictures and more particularly it relates to the display of pictures to give them a life-like and realistic appearance.

Attempts have been made heretofore to make pictures appear to be in third dimension by a variety of methods. The primary method of which is by optical illusion. However, most of these methods have failed because they are unduly complicated and cumbersome in the number and arrangement of parts. This results in a large and unwieldly display which is impractical to use upon a wall or in any other manner normally used for displaying pictures. This, of course, also results in a very costly item.

My invention contemplates the use of relatively few parts which are arranged in a novel manner to effect a picture having a third dimension. The essential novelty of my invention consists of a forwardly presented transparent concavo convex plate having a partial picture thereon in combination with a flat picture plate which parts, when viewed together, give depth perception to the picture. An additional novel feature of my invention is the provision of mirrors at either end of the front plate to accentuate the third dimensional effect and to give horizontal continuity to the picture.

According to the principles of my invention, it is believed that the effectiveness of this medium is best achieved by employing scenic pictures. Illustrative of such use is the placing of a partial picture, comprising trees, bushes and other foreground detail upon the forward plate which leaves transparent areas therebetween in order to permit the background picture to be viewed. The picture upon the back plate could comprise lakes, mountains and other horizon scenery to complement the forward partial picture. It is, of course, to be understood that a great variety of other pictures of one form or another are contemplated as being applicable with my new pictorial medium.

It is, therefore, a general object of my invention to provide a method for displaying pictures which imparts a third dimensional effect thereto.

Another object of my invention is the provision of a method of displaying pictures having a depth perception effect wherein the parts used therein are few and relatively inexpensive to make and assemble.

Still another object of my invention is to provide a pictorial display wherein the displayed pictures may be changed or replaced without interfering with the efficiency of over-all composition of the invention.

Yet another object of this invention is to provide an illusion of panorama by the addition of reflecting pieces.

These and other objects and advantages of this invention will hereinafter appear and for purposes of illustration, but not of limitation, a preferred embodiment of the invention is shown in the accompanying drawings in which:

Figure 1 is a perspective view of my new picture display;

Figure 2 is a front elevational view thereof;

Figure 3 is a sectional view taken on line 3—3 of Figure 2;

Figure 4 is a sectional view taken on line 4—4 of Figure 2;

Figure 5 is a sectional view taken on line 5—5 of Figure 3; and

Figure 6 is a sectional view taken on line 6—6 of Figure 4.

Referring now in detail to the drawings, a frame, generally indicated as 10, is provided to house the essential parts of my invention. The frame 10 may be made of any suitable material usually employed in making picture frames and comprises the usual side members 12 and 13, a top 14 and a bottom 16. The general design or contour of the frame may take any preferred form although I have shown a "shadow box" type design; that is, a design wherein the side walls, top and bottom walls are disposed at angles as shown in Figures 1 and 2 of the drawings.

Mounted within the frame 10 is a foreground picture plate 18 which is straight throughout its height but is concavo convex from side to side, the ends of which terminate near the back of the frame 10. As can be readily seen from Figure 4, the plate 18 is preferably placed so that its forwardmost portion is set in back of the forward edges of the frame walls. The plate 18 is transparent and may be made of glass or any other transparent material. Preferably, the concavo convex plate 18 forms a substantially true radius in order to enhance the third dimensional effect.

Mounted rearwardly of the plate 18 and at the back of the frame 10 is a flat background picture plate 20 having its ends terminating adjacent to the ends of the foreground picture plate 18 at the sides of the frame 10. Since the foreground plate 18 is concavo convex, the plate is spaced apart from the background plate 20 variably throughout the length of these plates which imparts a third dimension or perception of depth between the two plates.

For purposes of illustration I have shown, in Figures 1 and 2, a preferred type of picture to illustrate the third dimensional effect resulting from the positioning of the plates 18 and 20. A partial picture, continuous or otherwise and being generally indicated by the numeral 22 and shown in heavy lines, comprising trees, bushes and other scenic foreground is attached to the back side of the forward plate 18 by any suitable means. In view of the fact that the plate 18 is transparent, where the partial picture 22 does not cover the plate 18, the background plate 20 can be seen.

A picture, generally indicated as 24, is also secured by any suitable means to the back plate 20 and in order to blend in with and complement the picture 22 comprises a lake, mountains, trees and other horizon scenery. The picture 24 generally completely covers the back plate 20. I have indicated the picture in lighter lines than the lines of the picture 22 secured to the forward plate 18 in an endeavor to provide some semblance of depth perception to the drawing which is present in the physical embodiment.

Thus, the combination of a partial picture upon a concavo convex plate which is in spaced apart relationship from a back picture plate gives the combined pictures a realistic and life-like appearance not otherwise attainable.

In order to accentuate and highlight the pictures 22 and 24, I have provided separate light sources. To enhance the picture 22 secured to the forward plate 18, I have provided a source of light 26, which can be a fluorescent tube or any other similar lighting means. The light 26 is secured in any desired manner in back of the plate 18 and within the bottom wall 16 of the frame 10. To insure that the light 26 will only reflect and illuminate the forward plate 18 and picture 22 secured thereto, I have provided a light guard plate 28 to prevent the light rays from being reflected back upon the back plate 24. Any such light reflections would not only distort the back picture, but would result in blind spots thereon. Depending upon the type of picture 22 used and the material from which the picture 22 is made, the source of light will penetrate the picture and highlight it to a great degree.

Similarly, in order to enhance the background picture 24 secured to the back plate 20, I have also provided a lamp 30 or other source of light which is secured rearward of the plate 20 and within the top wall 14 of the frame 10 by any convenient means. To obtain the best effect of the light and to obtain a more compact display, I have also provided a back panel 32 for the frame 10. The sources of light 26 and 30 are kept out of direct view by providing top and bottom cover panels 34 and 36, which panels also lend aesthetic appearance to the complete frame. The bottom frame 36 in addition serves as a support for the plates 18 and 20.

Also within the frame 10, and coinciding with the foreground plate 18, throughout its entire height, I have provided mirrors 38 and 40 at either side of the frame 10. These mirrors may be attached by any desirable means directly to the side walls 12 and 13 as shown in the drawings, or they may be set apart from the side walls 12 and 13 depending upon the desired contour of the display frame 10. However, the mirrors 38 and 40 must be placed in an angular position so that they are substantially perpendicular to the vertical line of coincidence between the reflecting surfaces of the mirrors and the forward picture plate 18. That is, the mirrors should be positioned so that they are at a substantially ninety degree (90°) angle to the plane of the plate 18 where the mirrors coincide therewith.

When the mirrors are placed substantially perpendicular to the forward plate 18, a horizontal panoramic illusion of continuity is effected wherein it appears that the picture extends out beyond the side walls 12 and 13 of the frame 10. Additionally, I have found that this positioning of the mirrors also reduces reflection from the picture which otherwise would interfere with the clearness of the picture as well as the depth perception thereof.

As can be seen, I have constructed my side walls 12 and 13 at an angle which are substantially perpendicular to the forward plate 18. By thus constructing the side walls 12 and 13, I can secure the mirrors 38 and 40 directly to the side walls 12 and 13 which, of course, lends itself to a less expensive and better type of construction.

Since the pictures 22 and 24 are secured to the plates 18 and 20 by any suitable means such as transparent glue or printed by any suitable commercial process, etc., it is possible to remove the pictures at any time and to replace them with altogether different pictures or different forms of pictures. This greatly enhances the utility of this invention.

As can be readily seen from the above description, I have provided a new and novel combination of elements wherein pictures can be viewed in life-like relief. A further new and novel appearance has also been achieved by adding mirrors critically positioned within the picture frame which adds the illusion of panoramic picture continuity. Thus, for the first time, it is believed, a new method of displaying pictures has been provided which gives not only a third dimensional effect but in addition, a horizontal expansive illusion.

While I have shown and described specific embodiments of my invention, it will, of course, be understood that I do not wish to be limited thereto and that by the appended claims I intend to cover all modifications and alternative constructions falling within the true spirit and scope of the claims.

I claim:

1. An illuminated picture display comprising, in combination, a curved transparent plate having the foreground portion of a picture attached to its surface, a flat transparent plate having the background of the picture attached to it, a pair of flat reflecting surfaces perpendicularly intersecting the edges of the cylindrical plate and diverging radially outward and lying in radii of circle on which the curved transparent plate was formed, a frame surrounding the picture plates and reflecting surfaces, an illuminating means within the frame in front of the flat background plate, and a second illuminating means disposed in back of the flat groundplate to afford illumination therefor.

2. An illuminated picture display comprising, in combination, a curved transparent plate having the foreground portion of a picture attached to its surface, a flat background plate having the background of the picture attached to it, a pair of flat reflecting surfaces perpendicularly intersecting the edges of the cylindrical plate and diverging radially outward and lying in the radii of the circle on which the curved transparent plate was formed, a frame surrounding the picture plates and reflecting surfaces, and an illuminating means disposed between the foreground and background plates within the frame to light the picture plates.

References Cited in the file of this patent

UNITED STATES PATENTS

| | | |
|---|---|---|
| D. 23,079 | Hermann | Feb. 20, 1884 |
| 813,087 | Gatzert | Feb. 20, 1906 |
| 956,916 | Wiederseim | May 3, 1910 |
| 1,141,776 | Cooper | June 1, 1915 |
| 1,908,772 | Lowenthal | May 16, 1933 |
| 2,241,182 | Cayo | May 6, 1941 |
| 2,565,553 | Foley | Aug. 28, 1951 |
| 2,588,545 | Lawrence | Mar. 11, 1952 |

FOREIGN PATENTS

| | | |
|---|---|---|
| 23,162 of 1929 | Australia | Oct. 7, 1930 |